E. F. W. ALEXANDERSON.
INDUCTION MOTOR.
APPLICATION FILED DEC. 1, 1913.
1,185,461.
Patented May 30, 1916.
2 SHEETS—SHEET 1.
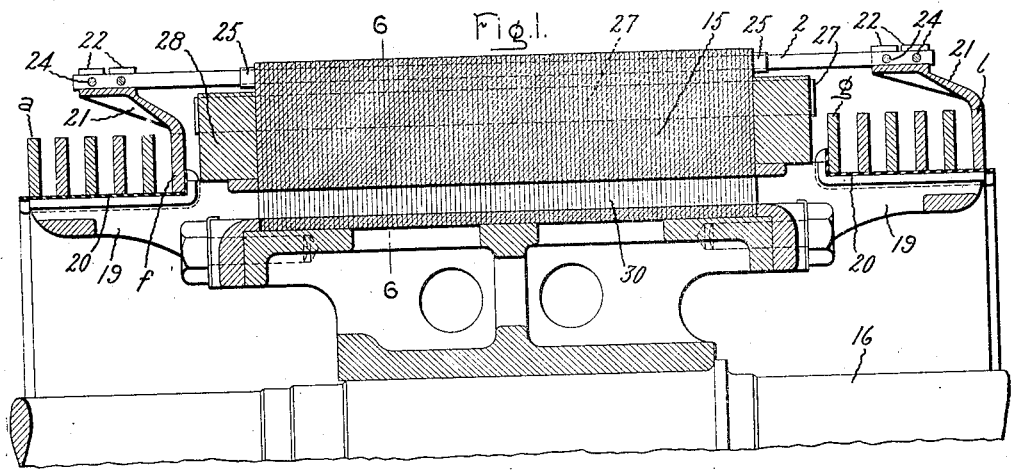
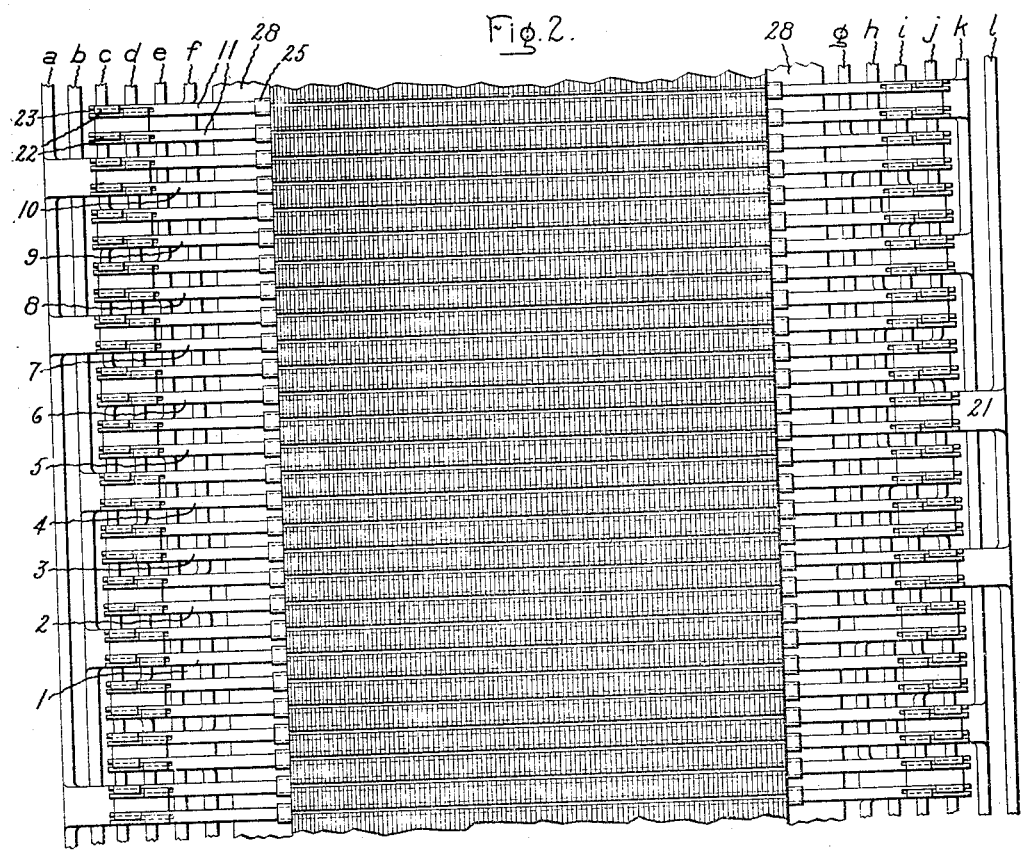
Witnesses:
Chas B Stokes
J Ellis Glen
Inventor:
Ernst F. W. Alexanderson,
by Albert G. Davis
His Attorney.

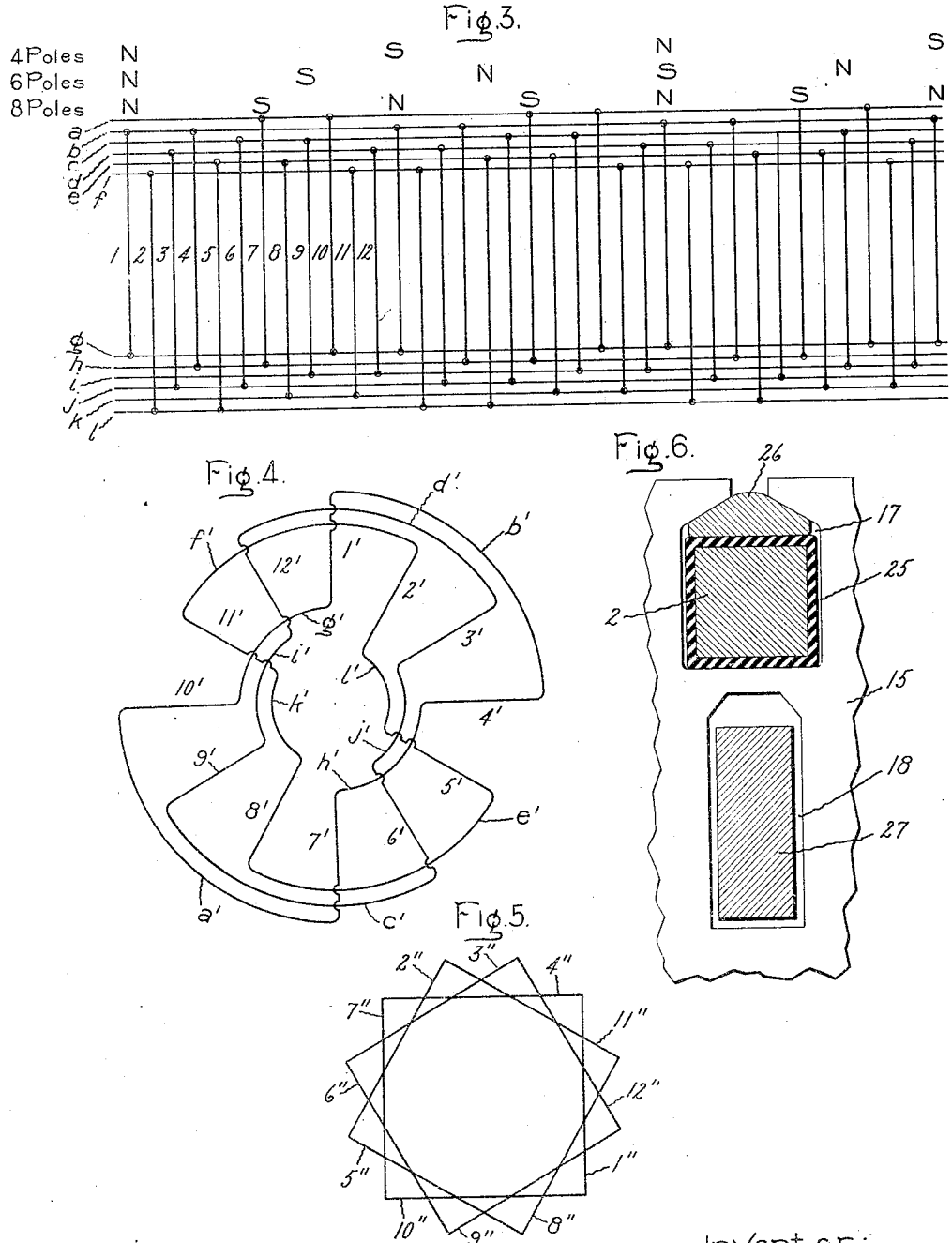

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

INDUCTION-MOTOR.

1,185,461.      Specification of Letters Patent.      Patented May 30, 1916.

Application filed December 1, 1913. Serial No. 803,927.

*To all whom it may concern:*

Be it known that I, ERNST F. W. ALEXANDERSON, a citizen of the United States, residing at Schenectady, in the county of Schenectady, State of New York, have invented certain new and useful Improvements in Induction-Motors, of which the following is a specification.

My invention relates to induction motors and in particular to induction motors designed to operate at a plurality of different speeds.

More specifically my invention relates to the secondary winding of an induction motor of that general type in which different speeds are obtained by the provision of a primary winding adapted to be connected in a plurality of different polar arrangements.

The object of my invention is to provide a novel and improved construction of secondary winding for an induction motor.

More particularly the object of my invention is to provide a novel construction of secondary winding which is peculiarly adapted to be employed with a primary winding designed to produce a plurality of different polar arrangements.

A further object of my invention is to provide a secondary winding which will impart to a motor having a primary winding of the character mentioned an increased starting torque together with efficient and satisfactory operating characteristics.

The features of my invention which I consider novel and patentable are definitely indicated in the claims appended hereto. The principles of my invention and the features of construction and mode of operation of an induction motor having a secondary member embodying these principles will be understood from the following description taken in connection with the accompanying drawings in which:

Figure 1 is a sectional elevation of the secondary member of an induction motor embodying my invention; Fig. 2 is a plan view developed upon a plane surface of a portion of said secondary member; Fig. 3 is a diagrammatic view showing the arrangement of connection of the conductor bars to the end rings and the relation of the secondary winding to the various polar arrangements of the primary winding; Figs. 4 and 5 are explanatory diagrams; and Fig. 6 is a sectional view taken on the line 6—6 of Fig. 1.

The principle of my invention will be most readily understood by reference to Fig. 3 of the drawings. In this figure I have diagrammatically illustrated the conductor bars of the secondary winding of my invention by vertical lines. The end rings of the secondary winding are represented by horizontal lines, and it will be noted that I provide six end rings at each end of the conductor bars. I have diagrammatically illustrated in Fig. 3 of the drawings a preferred arrangement of connecting the conductor bars to the end rings, but it will be understood that the bars may be connected in other ways without departing from the spirit of my invention. The method of determining a proper connection of the conductor bars to the end rings for the purposes of my invention will be explained in detail hereinafter.

The primary winding of the motor is adapted to be connected in a plurality of different polar arrangements. This characteristic of the primary winding may be produced by any of the well-known types of winding, and since the primary winding of itself forms no part of my present invention, I have merely designated the different polar arrangements of this winding by three rows of letters, N and S, in Fig. 3 of the drawings. The top row of letters represent the space relation of the poles of the primary winding when arranged as a 4-pole winding, the middle row of letters represent the space relation of the poles when the primary winding is arranged as a 6-pole winding, and the bottom row of letters represents the space relation of the poles when the primary winding is arranged as an 8-pole winding.

The conductor bars in my preferred construction of secondary winding are divided into sections, each section including twelve, or a multiple of twelve, bars, and the corresponding bars of each section being connected between the same pair of end rings. With the 4-pole arrangement of the primary winding, twelve, or a multiple of twelve, conductor bars will thus be embraced between adjacent poles. I have designated in Fig. 3 of the drawings the conductor bars of one section by reference characters 1 to 12 inclusive. The end rings at one end of these conductor bars are designated in this figure by reference characters $a$, $b$, $c$, $d$, $e$ and $f$, while the end rings at the other end of the conductor bars are designated by reference characters $g$, $h$, $i$, $j$, $k$, and $l$.

The horizontal lines at which the vertical lines terminate, represent the end rings to which particular conductor bars are electrically connected, and it will be understood that each conductor bar is insulated from the other ten end rings. It will thus be observed that conductor bar 1 is electrically connected between end rings $b$ and $g$ and insulated from each of the other end rings, and conductor bar 2 is electrically connected between end rings $f$ and $l$ and insulated from all of the other end rings. Each section of twelve conductor bars is further divided into four groups of three conductor bars each. The conductor bars of each group are connected at their respective ends to alternate end rings. The conductor bars of each group are further electrically connected at one end to the same end rings as the corresponding bars of one adjacent group, these end rings being adjacent to the end rings to which the corresponding bars of the other adjacent group are connected. Further, the conductor bars of one group are electrically connected at one end to the same end rings as the corresponding bars of one adjacent group and at the other end to end rings adjacent to those to which the corresponding bars of said adjacent group are connected. The relation of the connection of the conductor bars to one set of end rings with respect to the corresponding conductor bars of an adjacent group is the same as the relation of the connection of the bars to the opposite set of end rings with respect to the corresponding bars of the other adjacent group. Thus the conductor bars 5, 6 and 7, comprising one group, are connected at one end to the same end rings, $e$, $c$, and $a$, as the corresponding conductor bars 8, 9, and 10, of an adjacent group and these end rings are adjacent to the end rings $f$, $d$, and $b$, to which the corresponding conductor bars 2, 3, and 4, of the other adjacent group are connected. It will further be observed that the conductor bars 5, 6, and 7 are connected at the other end to the same end rings $l$, $j$, and $h$, to which conductor bars 2, 3, and 4 respectively are connected, and these end rings are adjacent to the end rings $k$, $i$, and $g$, to which the bars 8, 9, and 10 respectively are connected.

The construction of winding above described is such that each conductor bar is connected to the same pair of end rings to which another conductor bar, located at a distance from the first bar which corresponds to one pole pitch for the 4-pole arrangement of the primary winding, is connected. When the primary winding is arranged as a 4-pole winding all of the conductor bars are connected to the end rings as a 100 per cent. or full pitch winding, and there thus results a complete short circuit for every bar, and the winding as a whole acts as an ordinary squirrel cage winding.

When the primary winding is arranged as a 6-pole winding the conductor bars are connected to the end rings to form in substance a secondary winding having 150 per cent. pitch. This is equivalent to a winding of 50 per cent. pitch, and the winding, therefore, works substantially like a 50 per cent., or half pitch winding. If the paths of the current are traced out with coils of 150 per cent., or 50 per cent., pitch, individually short circuited, the conductor bars in each slot will be found carrying current which partially neutralizes the current in the other coöperatively connected bars, like an ordinary 50 per cent. pitch winding. However, with the squirrel cage winding as herein described, the individual short circuited coils are linked into a continuous chain so that in addition to the current induced in any one conductor bar two other currents, opposite in direction, will tend to flow therein, since the conductor bar is common to two adjacent circuits of equivalent half pitch, and is thus equally spaced between two conductor bars of full pitch. The resulting current in the conductor bar, therefore, has the same value and phase relation as in an ordinary squirrel cage winding or in a full pitch winding.

At the point where the conductor bar is connected to an end ring the current is divided vectorially into two components of approximately 90° phase relation. One component is the resultant of the currents induced in the two adjacent coöperating conductor bars and the other component is the current induced in the conductor bar itself. Due to the space relation of these bars the two components in question will be approximately 90° out of phase. The current flowing into an end ring will combine with other currents that flow in other bars connected to the same end rings. The result is that the effective currents flowing in the end rings are somewhat greater than they would be with a full pitch winding or normal squirrel cage winding. This must be taken into account in designing the end rings. Since it is usually desirable to concentrate the resistance in the end rings, where the heat generated can be easily carried away by ventilation, such special design of the end rings is not objectionable.

When the primary winding is arranged as an 8-pole winding the conductor bars are in effect open circuited, since the short circuits are formed between bars which are displaced by 200 per cent. pitch, and, therefore the short circuits are ineffective, and substantially no current will flow in the winding under this polar arrangement. In connecting up the different bars and end rings, however, special care must be taken that other short circuits are not formed by closing a circuit formed by several intermediate bars and sections of end rings. The connections must, therefore, be laid out so that no circuits are formed except in cases where the sum of all the E. M. F.'s induced in the same circuit combine to produce a resultant zero E. M. F., or into a voltage so low that no appreciable current will flow as a result thereof.

The method of checking up a proposed diagram of connections so as to fulfil these conditions is illustrated in Figs. 4 and 5 of the drawings. When any connection diagram, as for example the diagram of Fig. 3, has been decided upon, the relation of the voltage induced in the various conductor bars can be ascertained by vector diagrams. This is done by starting arbitrarily from any point in the connection diagram and following through the whole vector diagram by representing the magnitude and phase of the current induced in each conductor bar by a line of proper length and vectorial position. The figures formed in this way should form a closed system of lines, and a mistake in the connections is evidenced by the location of a particular point of reference in two places. If these two places are not far apart and the number of conductors forming the shortest circuit through these places are sufficiently great the two places can be connected together as one, thereby causing a slight distortion of the whole diagram.

Reference to Figs. 3, 4, and 5 of the drawing will more clearly elucidate my method of checking up a connection diagram. Twelve conductor bars are spanned by two poles of the 8-pole arrangement of the primary winding. The phase of the current in these twelve conductor bars is represented by the correspondingly numbered radial lines 1' to 12' inclusive of Fig. 4. The arcs of Fig. 4 represent the correspondingly lettered end rings, and the connections of these arcs to the radial lines correspond to the connections of the end rings to the conductor bars of the connection diagram of Fig. 3. The figures of Fig. 5 are obtained from the vectorial diagram of Fig. 4. The vertical line 1'' of Fig. 4 represents the phase and magnitude of the current induced in conductor bar 1. Conductor bar 1 is connected by end rings $b$ and $g$ to conductor bars 4 and 10, and the phase relation of the current in these bars is represented by the corresponding horizontal lines 4'' and 10'' of Fig. 5. Conductor bars 4 and 10 are connected to conductor bar 7 by end rings $h$ and $a$ and the phase of the current in bar 7, as given by the diagram of Fig. 4, is represented in Fig. 5 by the vertical line 7''. The length of the opposite sides of the figures of Fig. 5 indicate the comparative magnitude of currents displaced in phase by 180°, that is the magnitude of the current induced in bar 1 is equal to the magnitude of the current induced in bar 7, while currents of equal magnitude are induced in bars 4 and 10. It will be observed that the twelve conductor bars form three separate circuits, and that the vectorial sum of all the E. M. F.'s induced in any circuit is zero. In this manner the arrangement of connections illustrated in Fig. 3 is demonstrated to be satisfactory. Any connection diagram can be laid out as indicated in Fig. 3, and its practicability determined by the method described in connection with Figs. 4 and 5. If the resulting figures, corresponding to the diagram of Fig. 5 are not substantially closed the connection diagram will be found unsatisfactory in practice, due to the appreciable flow of current on account of more or less complex short circuited paths. Where it is desired to use a greater number of squirrel cage bars than could be combined into a system, such as heretofore described, without using an excessive number of end rings, it is possible to connect two bars permanently in multiple and consider them as one bar in the diagram developments of Figs. 3, 4, and 5. The short circuit thus formed by the multiple connection of two bars is ordinarily not great enough to cause any difficulty. It has been found, however, both by calculation and by experiments, that the connection of three bars in multiple may give an excessive short circuit current.

The conductor bars diagrammatically represented in Fig. 3 I propose to make of low resistance material, as, for example, copper. I, furthermore, propose to employ another and independent secondary winding having conductor bars of relatively high resistance positioned in the same or substantially the same slots as the low resistance conductor bars. The high resistance conductor bars are electrically connected to end rings, preferably of magnetic material, and form a high resistance secondary winding which is adapted to carry substantially the entire secondary current when the primary winding is arranged as an 8-pole winding, and thereby a satisfactory starting torque of the motor is insured for this polar arrangement of the primary winding. The practical arrangement of the secondary windings will be understood by reference to Figs. 1, 2 and 6 of the drawings. The secondary member of the motor comprises a magnetic core 15 made up of the usual laminated sheets of magnetic material, as, for example, thin sheets of iron. The magnetic core is secured to a rotatably mounted shaft 16, so that the secondary member of the motor constitutes the rotor. The magnetic core is provided near its surface with open slots 17 in which the conductor bars of low resistance are positioned. Below the slots 17 are located closed slots 18 which are adapted to contain the conductor bars of high resistance. The arrangement of the slots will best be understood by reference to Fig. 6.

The arrangement of the low resistance conductor bars and the mechanical details of connection of these bars to the various end rings will be understood by reference to Figs. 1 and 2. The end rings are lettered as in Fig. 3. Two conductor bars in multiple are employed in this winding and these pairs of conductor bars are numbered to correspond with the connection diagram of Fig. 3. The end rings are of considerable width and have a rectangular cross-section as shown in Fig. 1. The six end rings of each set are suitably arranged upon shelves or brackets 19 which may be integral with the frame of the motor. The end rings are insulated from the supporting shelves and the frame of the motor by insulating material 20. The low resistance conductor bars are all of the same length and the points of connection of each end of the bars to their respective end rings are located in substantially a common plane. This is accomplished by providing the end rings with vanes 21 which extend from the end ring to the common plane of connections of the end rings to the conductor bars. Each vane is provided at its end with two pairs of extensions 22 which engage in slots 23 in the ends of the conductor bars. This construction will be understood from Fig. 1 of the drawings, where conductor bar 2 is shown secured to the vanes of end rings $f$ and $l$. The extensions 22 of these vanes extend through the slots 23 at the ends of the conductor bar and are hammered over to rigidly secure the bar to the vanes. Rivets 24 are used in addition to positively secure the bar and vanes together. The low resistance conductor bars are incased in a shell of insulating material 25, as for example mica, to insulate the bars from the magnetic core and hence from each other. An appreciable voltage exists between the conductor bars under certain conditions, and I have found it desirable to insulate the conductor bars from the core to prevent a flow of the secondary current through the magnetic core between adjacent bars. Metallic wedges 26 secure the bars firmly in the slots. The conductor bars 27 of the high resistance secondary winding are preferably made of a high resistance steel alloy, as for example, nickel steel. These high resistance conductor bars are arranged in the closed slots 18, the size of the slot being sufficient to allow for clearance in construction and expansion of the bar due to heating when carrying current. The bars 27 are welded, or otherwise suitably secured, to steel end rings 28, which are carried by the frame of the motor. The high resistance conductor bars 27 are designed to have considerable heat storage capacity. To this end these bars have considerable mass. To assist in carrying away the heat developed in the conductor bars ventilating ducts 30 are provided in the magnetic core, and cooling air may be artificially circulated through these ducts.

The operation of my improved construction of secondary winding for an induction motor will, it is believed, be understood from the foregoing description. When it is desired to start the motor with considerable starting torque the primary winding will be arranged as an 8-pole winding, or generally as an $n_1$ pole winding. The low resistance secondary winding is open circuited in effect for this polar arrangement of the primary winding, and substantially no current will flow in this winding. All of the secondary current must flow in the high resistance winding, and thus a sufficiently large starting torque is developed. It will further be understood that the high resistance secondary winding may have an inductively changing effective resistance. The conductor bars are of magnetic material and are positioned in or at the bottom of relatively deep slots. The conductor bars therefore have considerable inductance since they are surrounded on all sides by magnetic material. In addition the end rings of this winding may be of magnetic material. When the motor is starting and the frequency of the secondary current is relatively high, this secondary winding will have a relatively high effective resistance, due to its high inductance and to the skin effect phenomenon. As the motor speeds up, the frequency of the secondary current decreases and also the effective resistance of the high resistance winding decreases. In this manner the effective ohmic value of the resistance of this winding automatically varies with the slip of the motor, and thereby an increased starting torque of the motor is insured. When the primary winding is arranged as a 4-pole winding, or generally as an $n_2$ pole winding, the low resistance conductor bars and their coöperating end rings form a secondary winding of full pitch. All of the secondary current will then flow in the low resistance winding, and the high resistance winding will carry little or no current. With this polar arrangement the motor operates as an ordinary polyphase induction motor with a squirrel cage winding. When the primary winding is arranged as a 6-pole winding, or generally as an $n_3$ pole winding, the low resistance conductor bars are connected to the end rings to form a 150 per cent. pitch winding. It is obvious that such a winding is an equivalent half pitch winding. With this polar arrangement of the primary winding, a part of the secondary current will flow in the high resistance secondary winding, and a part will flow in the low resistance secondary winding. With such polar arrangement the motor will have less starting torque than with the 8-pole primary winding, and greater starting torque than with the 4-pole primary winding.

With the possible polar arrangements of the primary winding which I have herein illustrated and described, it will be evident that the greatest starting torque is obtained with the winding arranged for minimum speed. This arrangement is therefore advantageous for starting. The next speed step will have less starting torque, and is advantageous for accelerating, while the third speed step is particularly designed for normal running conditions, and gives the maximum speed of the motor.

It will be understood from the foregoing description that I have provided an induction motor having a primary winding adapted to be connected in a plurality of different polar arrangements with a secondary winding in which the distribution of the secondary current is varied by changing the polar arrangement of the primary winding. The ratio of distribution of the secondary current between the high resistance winding and the low resistance winding is altered by changing the polar arrangement of the primary winding. The changing of the polar arrangement of the primary winding thus provides a simple means for directing more or less of the total secondary current to the high resistance winding. The inductively changing effective ohmic resistance of this winding, furthermore, assists in developing an increased torque of the motor at low speeds when this winding is carrying the greater portion of the secondary current.

Numerous modifications in the construction of my improved secondary winding for induction motors will be obvious to those skilled in the art. It will of course be understood that I do not desire to limit my invention to the specific construction herein illustrated and described by way of example. I have shown the low resistance secondary winding having twelve end rings, but it will be understood that fewer or more end rings may be employed without departing from the spirit of my invention. Numerous different combinations of conductor bars and end rings within the scope of my invention will be apparent to those skilled in the art. I have heretofore indicated the prerequisite characteristics of a secondary winding embodying my invention and have explained the method of determining the feasibility of employing any proposed arrangement of connections, and those skilled in the art will be enabled thereby to apply my invention in its most advantageous form to any particular problem at hand. I aim, therefore, in the appended claims to cover all modifications within the spirit and scope of my invention.

What I claim as new and desire to secure by Letters Patent of the United States, is:—

1. In an induction motor, means for producing primary magnetic fields of different polar arrangements, a secondary member comprising a magnetic core, a relatively high resistance secondary winding carried by said core, low resistance conductor bars also carried by said core, and a plurality of low resistance end rings connected to said conductor bars to form a substantially short-circuited winding with a primary magnetic field of one polar arrangement and a substantially open-circuited winding with a primary magnetic field of another polar arrangement, the number of end rings at each end of said conductor bars being smaller than the number of conductor bars per pole with reference to the primary magnetic field for which said conductor bars form a substantially short-circuited winding.

2. In an induction motor, means for producing primary magnetic fields of $n_1$ and $n_2$ poles, a secondary member comprising a magnetic core, conductor bars carried by said core, and a plurality of end rings connected to said conductor bars to form a substantially full pitch secondary winding with a primary magnetic field of $n_2$ poles and to form a secondary winding of a pitch other than full pitch with a primary magnetic field of $n_1$ poles, the number of end rings at each end of said conductor bars being less than the number of conductor bars per pole with reference to the primary magnetic field of $n_2$ poles.

3. In an induction motor, means for producing primary magnetic fields of different polar arrangements, a secondary member comprising a magnetic core, a relatively high resistance secondary winding carried by said core, low resistance conductor bars also carried by said core, and a plurality of low resistance end rings connected to said conductor bars so that substantially all of the secondary current is carried by the high resistance winding with a primary magnetic field of one polar arrangement and so that substantially all the secondary current is carried by said low resistance conductor bars with a primary magnetic field of another polar arrangement, the number of end rings at each end of said conductor bars being less than the number of conductor bars per pole with reference to that polar arrangement of the primary magnetic field with which said low resistance conductor bars carry substantially all the secondary current.

4. In an induction motor, means for producing primary magnetic fields of different polar arrangements, a secondary member comprising a magnetic core, a relatively high resistance secondary winding carried by said core, relatively low resistance conductor bars also carried by said core, and a plurality of end rings connected to said relatively low resistance conductor bars in such a manner that the ratio of the amount of the secondary current flowing in the high resistance winding to the total secondary current can be varied by changing the polar arrangement of the primary magnetic field, the number of end rings at each end of said conductor bars being less than the number of conductor bars per pole with reference to that polar arrangement of the primary magnetic field with which said low resistance conductor bars carry relatively the greater part of the total secondary current.

5. In an induction motor, means for producing primary magnetic fields of different polar arrangements, and a secondary winding comprising a plurality of conductor bars electrically connected at each end to a plurality of end rings so as to form a plurality of squirrel cage windings electrically interconnected in such a manner that the sum of all the E. M. F.'s induced in the conductor bars of every closed circuit is substantially zero with a primary magnetic field of one polar arrangement, each of said squirrel cage windings having one end ring in common with a second of said squirrel cage windings and a second end ring in common with a third of said squirrel cage windings.

6. In an induction motor, means for producing primary magnetic fields of different polar arrangements, a secondary member comprising a magnetic core, conductor bars carried by said core, and end-connections for said conductor bars forming a plurality of closed circuits of substantially 100 per cent. pitch for one polar arrangement of the primary magnetic field and such that the sum of all the E. M. F.'s induced in the conductor bars of every closed circuit is substantially zero with a primary magnetic field of another polar arrangement, each of the closed circuits having one of its end-connections in common with a second closed circuit and its other end-connection in common with a third closed circuit.

7. In an induction motor, means for producing primary magnetic fields of $n_1$ and $n_2$ poles, a secondary member comprising a magnetic core having slots therein, conductor bars of magnetic material and having a relatively high resistance located in certain of said slots, end rings electrically connecting said high resistance conductor bars, conductor bars of relatively low resistance located in others of said slots and above said high resistance conductor bars, and end rings electrically connecting said conductor bars of relatively low resistance as a full pitch winding when a primary magnetic field of $n_2$ poles is produced and in such a manner that the conductor bars are in effect open-circuited when a primary magnetic field of $n_1$ poles is produced.

8. In an induction motor, means for producing primary magnetic fields of $n_2$ and $n_3$ poles, a secondary member comprising a magnetic core, conductor bars carried by said core, and a plurality of end rings electrically connecting said conductor bars as a full pitch winding when a primary magnetic field of $n_2$ poles is produced and as an equivalent half pitch winding when a primary magnetic field of $n_3$ poles is produced.

9. In an induction motor, means for producing primary magnetic fields of $n_1$ and $n_3$ poles, a secondary member comprising a magnetic core, conductor bars carried by said core, and a plurality of end rings electrically connecting said conductor bars as an equivalent half pitch winding when a primary magnetic field of $n_3$ poles is produced and in such a manner that the conductor bars are in effect open circuited when a primary magnetic field of $n_1$ poles is produced.

10. In an induction motor, means for producing primary magnetic fields of $n_1$, $n_2$ and $n_3$ poles, a secondary member comprising a magnetic core, conductor bars carried by said core, and a plurality of end rings electrically connecting said conductor bars as a full pitch winding when a primary magnetic field of $n_2$ poles is produced and as an equivalent half-pitch winding when a primary magnetic field of $n_3$ poles is produced and so that the conductor bars are in effect open-circuited when a primary magnetic field of $n_1$ poles is produced.

11. In an induction motor, means for producing primary magnetic fields of $n_1$, $n_2$ and $n_3$ poles, a secondary member comprising a magnetic core, a relatively high resistance secondary winding carried by said core, low resistance conductor bars also carried by said core, and end rings electrically connecting said conductor bars as a full pitch winding when a primary magnetic field of $n_2$ poles is produced and as an equivalent half-pitch winding when a primary magnetic field of $n_3$ poles is produced and in such a manner that the conductor bars are in effect open-circuited when a primary magnetic field of $n_1$ poles is produced.

12. In an induction motor, means for producing primary magnetic fields of $n_1$, $n_2$ and $n_3$ poles, a secondary member comprising a magnetic core having two concentric rows of slots therein, conductor bars of magnetic material and having relatively high resistance located in the inner row of slots, magnetic end rings electrically connecting said high resistance conductor bars, conductor bars of relatively low resistance located in the outer row of slots, and end rings electrically connecting said conductor bars of relatively low resistance as a full pitch winding when a primary magnetic field of $n_2$ poles is produced and as an equivalent half pitch winding when a primary magnetic field of $n_3$ poles is produced and in such a manner that the conductor bars are in effect open-circuited when a primary magnetic field of $n_1$ poles is produced.

13. In an induction motor, means for producing primary magnetic fields of different polar arrangements, a secondary member comprising a magnetic core, conductor bars carried by said core, and a plurality of end rings at each end of said conductor bars, said conductor bars being arranged in groups, the conductor bars of each group being electrically connected at one end to the same end rings as the corresponding bars of one adjacent group which end rings are adjacent to the end rings to which the corresponding bars of the other adjacent group are connected.

14. In an induction motor, means for producing primary magnetic fields of different polar arrangements, a secondary member comprising a magnetic core, conductor bars carried by said core, and a plurality of end rings at each end of said conductor bars, said conductor bars being arranged in groups, the conductor bars of one group being electrically connected at one end to the same end rings as the corresponding bars of one adjacent group and at the other end to end rings adjacent to those to which the corresponding bars of said adjacent group are connected.

15. In an induction motor, means for producing primary magnetic fields of different polar arrangements, a secondary member comprising a magnetic core, conductor bars carried by said core, said conductor bars being arranged in groups, and a plurality of end rings at each end of said conductor bars, the corresponding bars of particular pairs of adjacent groups being electrically connected at one end to the same end rings and the bars of such pairs of groups being connected at the same end to the same end rings as the corresponding bars of each alternate pair of groups.

16. In an induction motor, means for producing primary magnetic fields of different polar arrangements, a secondary member comprising a magnetic core, conductor bars carried by said core, said conductor bars being arranged in sections and each section of bars spanning the distance between two adjacent poles for one polar arrangement of the primary winding, and a plurality of end rings arranged at each end of said conductor bars, each section of said conductor bars being further divided into a plurality of groups the conductor bars of each group being electrically connected at one end to alternate end rings, the corresponding bars of particular pairs of adjacent groups being connected at one end to the same end rings and the bars of such pairs of groups being connected at the same end to the same end rings as the corresponding bars of each alternate pair of groups.

17. In an induction motor, a secondary member comprising a magnetic core, a plurality of conductor bars of substantially the same length, carried by said core, a plurality of end rings at each end of said conductor bars, vanes arranged on said end rings at predetermined distances and having their ends extending into a substantially common plane coincident with the ends of the conductor bars, and means for securely connecting the vanes to the conductor bars toward which they extend.

18. In an induction motor, a secondary member comprising a magnetic core, a plurality of conductor bars of substantially the same length and having a slot in each end thereof carried by said core, a plurality of end rings at each end of said conductor bars, vanes arranged on said end rings at predetermined distances and having their ends extending into a substantially common plane coincident with the ends of the conductor bars, extensions on said vanes adapted to register with the slots of the conductor bars toward which the respective vanes extend, and means for securely connecting the bars to said extensions.

19. In an induction motor, means for producing primary magnetic fields of $n_1$, $n_2$ and $n_3$ poles, where $$\frac{n^2}{n_3}$$

is other than $\frac{1}{2}$, a secondary winding of the squirrel cage type comprising a plurality of conductor bars connected at each end to a plurality of end rings, the connection of said bars to said end rings being such that said secondary winding operates in effect as an ordinary squirrel cage winding when a primary magnetic field of $n_2$ or $n_3$ poles is produced and is in effect open circuited when a primary magnetic field of $n_1$ poles is produced.

20. In an induction motor, means for producing primary magnetic fields of different polar arrangements, a secondary member comprising a magnetic core, conductor bars of relatively high resistance carried by said core, end rings electrically connecting said high resistance conductor bars, conductor bars of relatively low resistance carried by said core, an insulating shell surrounding each of said low resistance conductor bars to insulate the conductor bars from the magnetic core, and a plurality of end rings electrically connecting said low resistance conductor bars as a full pitch winding when a primary magnetic field of one polar arrangement is produced and so that these conductor bars are in effect open-circuited when a primary magnetic field of another polar arrangement is produced.

21. In an induction motor, means for producing primary magnetic fields of different polar arrangements, a secondary member comprising a magnetic core, a secondary winding of relatively high resistance carried by said core, conductor bars of relatively low resistance carried by said core, an insulating shell surrounding each of said conductor bars to insulate the conductor bars from the magnetic core, and a plurality of end rings electrically connecting said conductor bars to form a substantially short-circuited winding with a primary magnetic field of one polar arrangement and a substantially open-circuited winding with a primary magnetic field of another polar arrangement.

22. In an induction motor, means for producing primary magnetic fields of $n_1$, $n_2$ and $n_3$ poles, where $$\frac{n_2}{n_3}$$

is other than $\frac{2}{3}$, a secondary winding of the squirrel cage type comprising a plurality of conductor bars connected at each end to a plurality of end rings, the connection of said bars to said end rings being such that said secondary winding operates in effect as an ordinary squirrel cage winding when a primary magnetic field of $n_2$ or $n_3$ poles is produced and is in effect open circuited when a primary magnetic field of $n_1$ poles is produced, and a secondary winding of relatively high resistance adapted to carry substantially all of the secondary current when a primary magnetic field of $n_1$ poles is produced.

23. In an induction motor, means for producing primary magnetic fields of $n_1$, $n_2$ and $n_3$ poles, a secondary member comprising a magnetic core having slots therein, conductor bars of a high resistance steel alloy located in certain of said slots, end rings of magnetic material electrically connecting said high resistance conductor bars, conductor bars of relatively low resistance located in others of said slots, an insulating shell surrounding each of said low resistance conductor bars to insulate these conductor bars from the magnetic core, and a plurality of end rings electrically connecting said low resistance conductor bars as a full pitch winding when a primary magnetic field of $n_2$ poles is produced and as an equivalent half-pitch winding when a primary magnetic field of $n_3$ poles is produced and so that the conductor bars are in effect open-circuited when a primary magnetic field of $n_1$ poles is produced.

24. In an induction motor, means for producing primary magnetic fields of $n_1$ and $n_2$ poles, a secondary member comprising a magnetic core, conductor bars carried by said core, and a plurality of end rings connected to said conductor bars to form a substantially 100 per cent. pitch winding with a primary magnetic field of $n_2$ poles and a substantially 200 per cent. pitch winding with a primary magnetic field of $n_1$ poles, the number of end rings at each end of the conductor bars being less than the number of conductor bars per pole with reference to the primary magnetic field of $n_2$ poles.

In witness whereof, I have hereunto set my hand this 29th day of November 1913.

ERNST F. W. ALEXANDERSON.

Witnesses:
BENJAMIN B. HULL,
HELEN ORFORD.